May 29, 1923.  1,457,173
H. KAGEYAMA
ELECTRICAL DIRECTION INDICATOR
Filed May 1, 1918    5 Sheets-Sheet 1
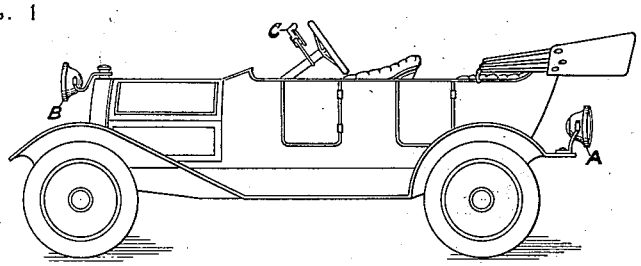
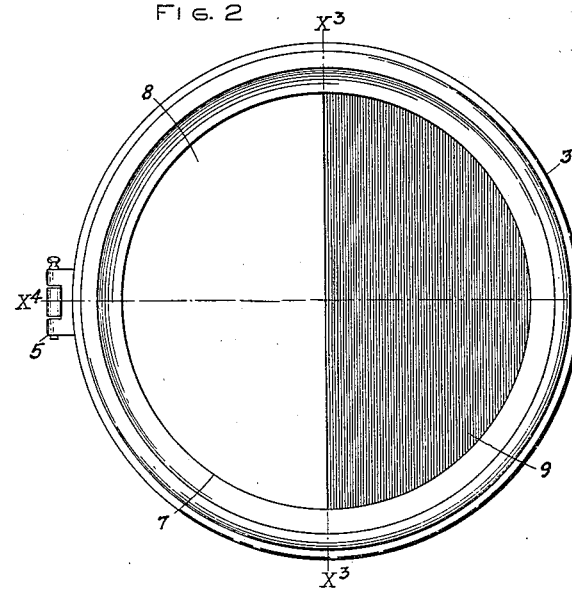
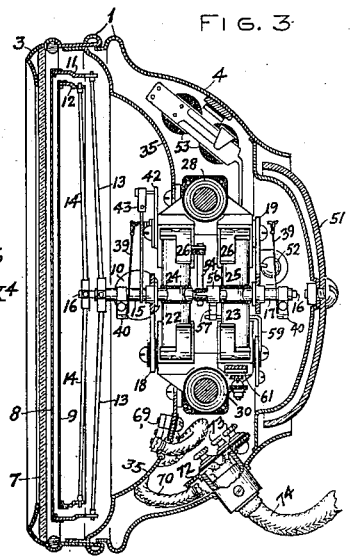
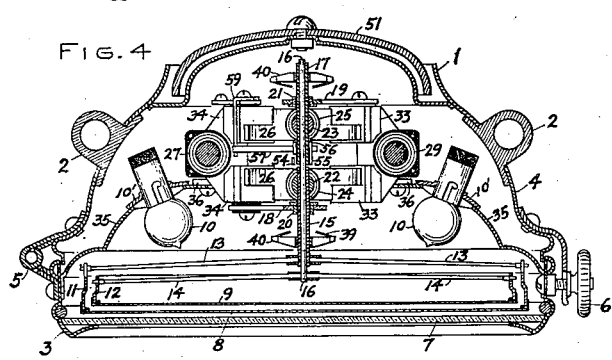
Inventor:
Hosaku Kageyama May 29, 1923.
H. KAGEYAMA
ELECTRICAL DIRECTION INDICATOR
Filed May 1, 1918
1,457,173
5 Sheets-Sheet 2
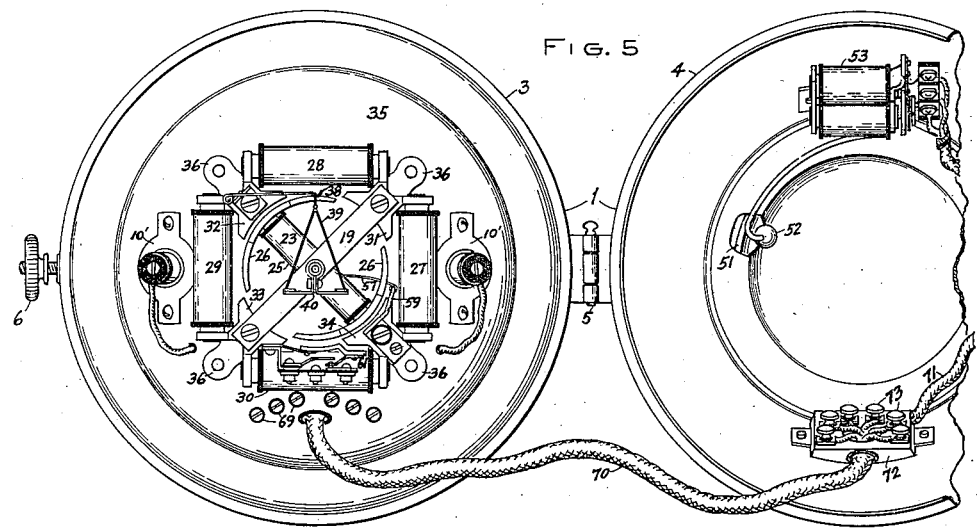
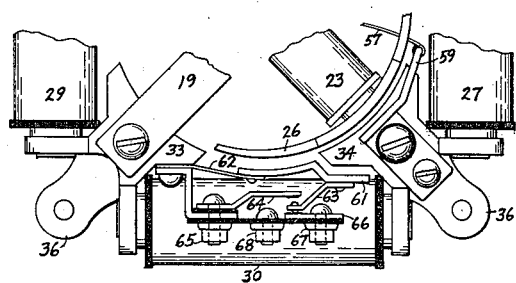
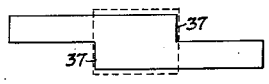
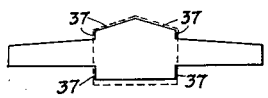
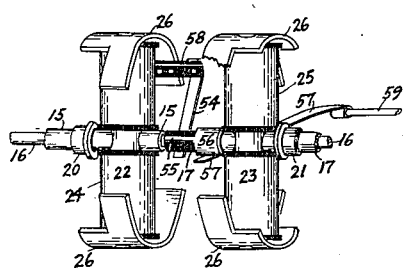
Inventor.
Hosaku Kageyama May 29, 1923.  1,457,173
H. KAGEYAMA
ELECTRICAL DIRECTION INDICATOR
Filed May 1, 1918   5 Sheets-Sheet 3
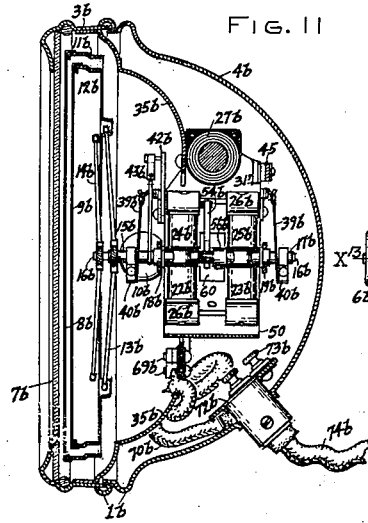
FIG. 11
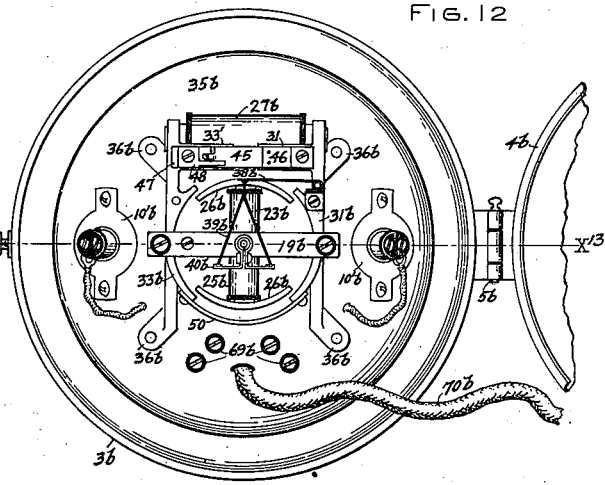
FIG. 12
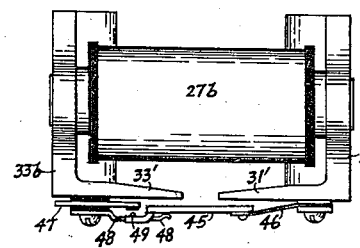
FIG. 14
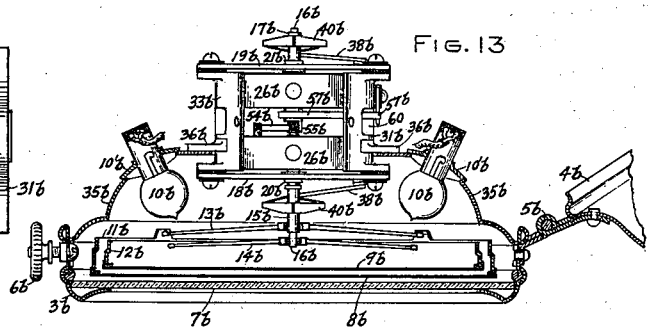
FIG. 13
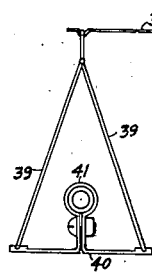
FIG. 15
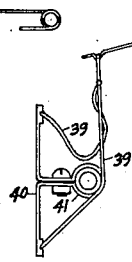
FIG. 16
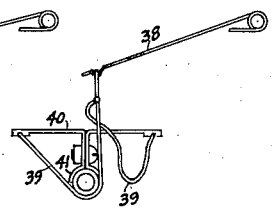
FIG. 17
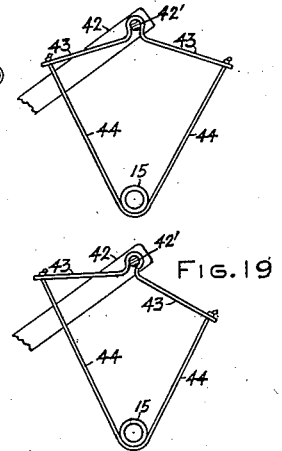
FIG. 18
FIG. 19
Inventor,
Hosaku Kageyama

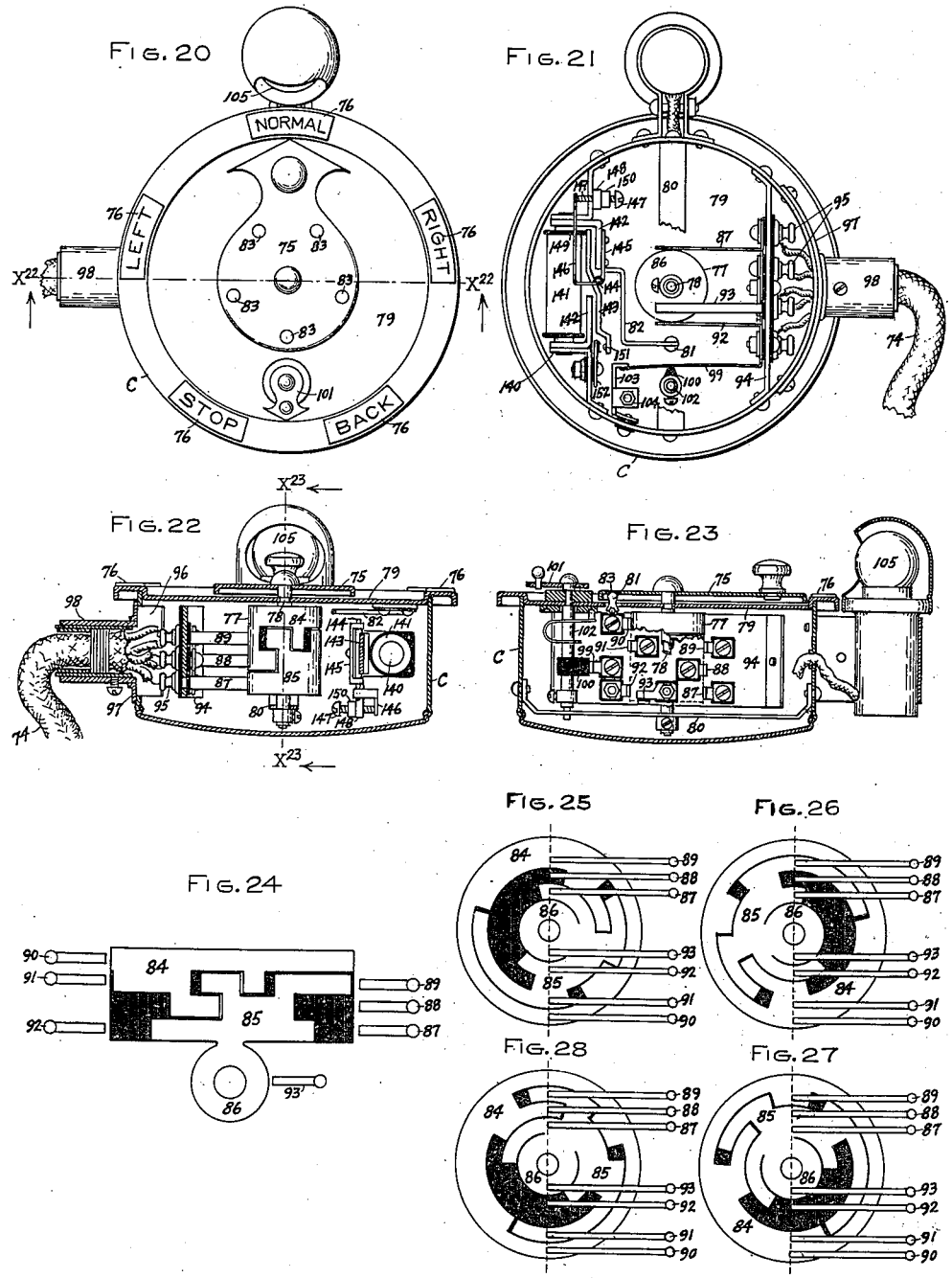

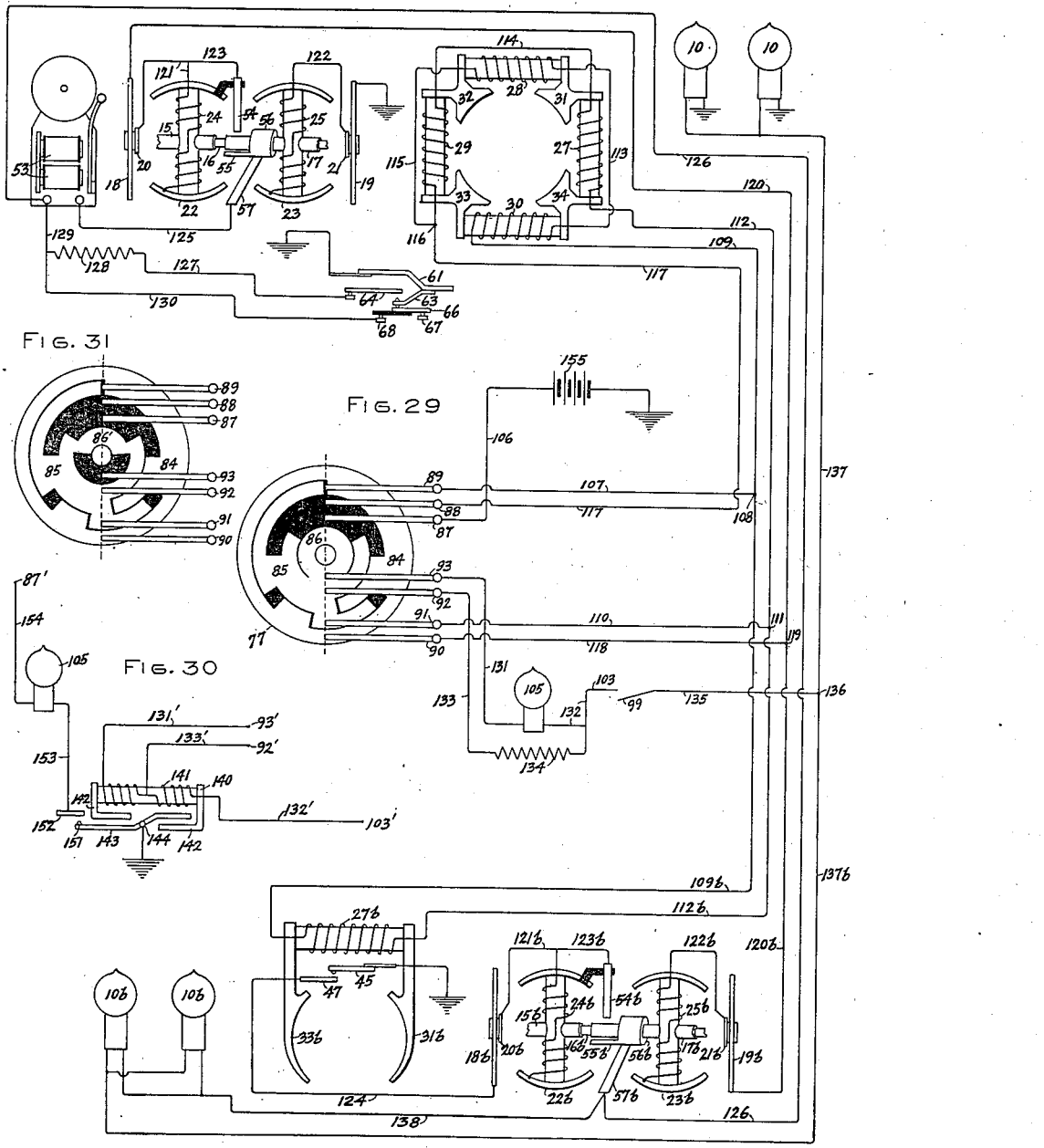

Patented May 29, 1923.

1,457,173

UNITED STATES PATENT OFFICE.

HOSAKU KAGEYAMA, OF LOS ANGELES, CALIFORNIA.

ELECTRICAL DIRECTION INDICATOR.

Application filed May 1, 1918. Serial No. 231,851.

*To all whom it may concern:*

Be it known that I, HOSAKU KAGEYAMA, a subject of the Emperor of Japan, residing at Los Angeles, county of Los Angeles, and State of California, have invented certain new and useful Improvements in Electrical Direction Indicators, of which the following is a specification.

This invention relates to an electrical direction indicator which is especially adapted for use on automobiles to indicate the direction in which the automobile is about to turn, or indicate that the automobile is about to stop or move backward, and while especially adapted for this purpose, it may be employed in any situation where information may be given by means of an indicator.

In a previous application of mine filed September 30th, 1914, Serial No. 864,302, I have shown a direction indicator of this character, the description of which, however, solely related to the operation of a single signal device, whereas the present invention relates to the operation of a pair of signal devices placed, one at the front and one at the rear of an automobile, and these two devices are not an exact duplication of one another, but they are constructed each to meet the specific requirements pertaining to the respective positions, the object sought being simplification of the parts of the multiple devices employed and also economical operation of the same.

Another object is to provide improved cautionary means for indicating to the operator whether the signal indicators and also signal lamps are operated or not.

Still other objects and advantages of my invention will appear from the following description:

Referring to the drawings:

Figure 1 is a view of an automobile equipped with my signal devices.

Figure 2 is a front view of one of the signal devices.

Figure 3 is a vertical section on line $X^3$—$X^3$ of Figure 2, showing the inside construction of the signal device which is to be used on the rear end of the automobile.

Figure 4 is a horizontal section on line $X^4$—$X^4$ of Fig. 2.

Figure 5 is a rear elevation of the same device as viewed when front frame is open from the body of the casing.

Figure 6 is a view on an enlarged scale of a lower portion of the motor device shown in Fig. 5, showing in detail a switch device for operating the electric bell.

Figure 7 is a view of the operating armatures detached, showing in detail another switch device for controlling the operation of the electric bell.

Figures 8 to 10 inclusive are views showing various forms of the armature pole pieces.

Figure 11 is a central vertical section of another signal device which is to be used on the front of the automobile.

Figure 12 is a rear elevation of what is shown in Figure 11, when the casing is open.

Figure 13 is a bottom sectional view on line $X^{13}$—$X^{13}$ of Figure 12.

Figure 14 is a top view on an enlarged scale of the field magnet shown in Figures 11 to 13 inclusive, showing in detail an automatic switch device controlling the circuit of the armatures.

Figures 15 to 17 inclusive are views of the signal restoring device in detail, showing the parts in various angular positions.

Figures 18 and 19 are views in detail of the spring device used for suspending the operating shafts.

Figure 20 is a front view of the manually operated switch device.

Figure 21 is a back view of the same device when the back cover is removed.

Figure 22 is a section on line $X^{22}$—$X^{22}$ of Figure 20.

Figure 23 is a section on line $X^{23}$—$X^{23}$ of Figure 22.

Figure 24 is a view showing the development of the switch drum shown in Figures 21 and 22.

Figures 25 to 28 inclusive are diagrammatic views of switch connections in various signal positions of the switch drum.

Figure 29 is a diagram of the electrical connections.

Figure 30 is a diagram of electrical connection of an alternative arrangement for controlling the auxiliary lamp which indicates the operation of the signal lamps.

Figure 31 is a diagrammatic view of a modified form of switch drum to be used with what is shown in Figure 30.

The invention embodies a pair of signaling devices adapted to be placed one on the rear end and the other at the front side of an automobile, or any other vehicle, to indicate its proposed movement to both oncoming and following vehicles, and both signaling devices are controlled by same switch mechanism located convenient to the operator.

Referring to Figure 1, A denotes the rear signal and B denotes the front signal. In the present embodiment the rear signal A is capable of giving four signal indications, which are to indicate turning to the right, to indicate turning to the left, to indicate the stopping and to indicate the backward movement. The front signal B is capable of giving only two signal indications, of turning to the right and turning to the left, as these are all that are required for protecting the front side of the vehicle. The switch device C is shown attached to the steering post and when the switch C is operated to either the position of the right or the left, both front and rear signals are simultaneously operated, while for other signal positions of the switch C, the rear signal A only is operated.

There is provided an audible signal to attract the attention of those around the vehicle when the signals appear. In the present embodiment this audible signal is carried by the rear signal A and as its sound can be heard at the front side of the vehicle also, the same provision has been dispensed with from the front signal. This audible signal is available as a means for indicating to the operator whether the signal devices are operated or not and is so connected that it can be operated only by the mutual cooperation of both front and rear signals, in case of indications of the right and the left while for other indications it is operated by the rear signal alone.

There are electric lamps provided on both front and rear signals to illuminate the same in the night. These signal lamps are simultaneously lighted as the signals are operated, but for the sake of economy the lamps of the front signal are arranged not to be lighted in those signal operations in which the front signal does not participate.

There is provided a lamp on the switch device C to illuminate the switch indicators. This switch lamp is employed as a means to indicate to the operator whether the signal lamps are lighted or not, and is so connected with the signal lamps that it burns with a normal brilliancy when all signal lamps are lighted, and in case any lamp of either the front or rear signal fails to burn, it can be noticed by the operator by either the diminished light or non operation of this switch lamp. Such is the case with the signal operation of the right or the left, and in case of the other signal indications the switch lamp is so connected that it burns normally so long as the lamps of the rear signal are lighted even though the front signal lamps are not operated. These or other details and peculiarities of the arrangement and operation will be hereafter fully described and then particularly pointed out in the claims.

The construction of the rear signal A is shown in Figures 2 to 10 inclusive, wherein the signal indicating device consists of plate members which are adapted to be moved into various relative positions by means of a pair of armatures with which they are respectively connected, the said armatures being independently moved with respect to each other and being operated by a field magnet device.

These instrumentalities are mounted inside of a case 1, which is adapted to be mounted on the automobile by lugs 2. The case 1 consists of a front frame 3 and a body 4, the front frame being adapted to swing open from the body of the case through a hinge 5, when the body 4 is released from a thumb screw 6, thereby exposing, as shown in Figure 5, the inside mechanism which can be conveniently inspected and at the same time facilitating the replacement of the signal lamps, the life of which is in no way permanent.

The front frame 3 is provided with a circular transparent front 7 through which the indicating plates are visible, there being in the present embodiment an outer plate 8 and an inner plate 9, the inner plate 9 being half white and the other half of distinguishing color, and the outer plate 8 being half white and the other half made transparent so as to reveal either half of said inner plate 9.

The white half of the outer plate 8, together with the white half of the inner plate 9 presents to view a complete blank surface which forms the normal or non signal indication. The same white half of the outer plate 8, together with the distinguishing color of the inner plate 9 forms a signal indication such as shown in Figure 2. This combination of two contrasting colors when displayed at various angular positions may be employed to indicate various movements of the vehicle. These are (a) the distinguishing color, right, as shown in Figure 2, which indicates turning to the right; (b) the distinguishing color, left, which indicates turning to the left; (c) the distinguishing color at the top, which can indicate the stopping; (d) the distinguishing color at the bottom, which may indicate moving to the back.

These indicating plates 8 and 9 are each made of a thin transparent material, adapted to be illuminated from the back, and are respectively secured to cylindrical frames 11 and 12, the latter being mounted respectively on a plurality of spokes 13 and 14 which radiate from respective operating shafts. In this way the plate 8 is connected to the shaft 15 and the plate 9 is connected to the shaft 16. The shaft 15 is of a tubular form and carries an armature 22, and the shaft 16 extending through the tubular shaft 15, is rigidly connected to an armature 23 by means of a sleeve 17. The shaft 15 is journaled in a frame 18 at the front and the shaft 16 is journaled to the rear in a frame 19 and these shafts, which fit loosely to each other are thus adapted to make concentric rotation to operate the indicating plates into various angular positions.

Surrounding the armatures are four field coils 27, 28, 29 and 30, mounted on the respective cores which are connected by four field poles 31, 32, 33 and 34. This field device is mounted on a concave frame 35 by means of lugs 36 provided on the pole pieces and through this concave frame 35 it is connected to the front frame 3 of the casing.

Figure 5 clearly shows the arrangement of the field coils and the field poles. By the co-operative energization of these four coils a pair of the field poles situated diametrically opposite, such as poles 31 and 33, may be energized, producing magnetic lines of force in one direction. Then, in another operation, the same pair of poles can be energized so as to produce magnetic lines of force in the reverse direction. Similarly the other pair of poles 32 and 34 can be energized in two different ways. These four different energizations of the field poles will attract the armatures 22 and 23 in four different ways, corresponding to aforementioned four signal positions. These operations will be better understood from the electrical circuits hereafter to be described.

The armatures 22 and 23 are respectively provided with coils 24 and 25. One end of coil 24 is connected to the body of the armature 22 and the other end of the coil is connected to a journal 20, which is in contact with the frame 18 but insulated from the shaft 15, and the frame 18 is insulated from the body of the field magnet to which it is attached. Similarly, one end of the coil 25 is connected to the body of the armature 23 and the other end of the coil is connected to a journal 21 which is in contact with frame 19 but insulated from the sleeve 17 and the frame 19 is directly connected to the body of the field magnet, which is grounded. The shafts 15 and 16 are in contact with each other and are respectively in metallic connection with the bodies of the armatures 22 and 23. Thus an electrical circuit may be established from one supporting frame to the other through the coils 24 and 25 which energize the armatures.

In Figures 3 and 4 the armatures have been shown in vertical positions, merely for convenience in showing the parts clearly. But in actual operation these armatures are placed in a position coaxial with a diametrically opposite pair of the field poles, and Figure 5 shows the armature 23 in its normal position, armature 22 being behind and in same position. In this position of the armatures the distinguishing color of the inner plate 9 stands at the top, covered by the white half of the outer plate 8 and the signal presents the appearance of a plain disk. The coil 24 of the armature 22 and the coil 25 of the armature 23 are so connected that if the current is sent through these coils in this normal position, magnetic lines of force produced in their respective cores are in opposite directions, and if these armatures are attracted by same field magnet they will take their respective positions, always displaced from each other by 180 degrees, resulting in uncovering the distinguishing color of the inner plate.

The armatures are provided each with a pair of pole pieces 26, and as they are seen in Figure 5 these armature pole pieces extend laterally so as to cover the air spaces between the field poles, the purpose of which is to carry magnetic lines of force of the armatures to lateral directions and thereby to enable the armatures to open attraction to those field poles which are located at right angles to the armatures, that is to say, the poles 31 and 33. However, the trouble with an armature pole piece which is larger than the field pole is that the turning torque of the armature is apt to cease at half way of the rotation and this ceasing of torque occurs at a point where the attracted end of the armature pole piece reaches the farthest end of the attracting field pole, as then the armature pole piece already completely covers the field pole, and further turning of the armature results in little increase of magnetic lines of force that can pass between the armature and the field.

A form of the armature pole piece which is designed to remedy this trouble is shown in Figure 8 and its modification in Figures 9 and 10, the drawings showing the face of each pole piece in projection. The form shown in Figure 8 can be seen in position in Figures 3 and 4 and in perspective in Figure 7. In all of these forms the middle portion of the armature pole piece is made wider than the lateral portions, so that when the lateral portion reaches to the limit of attraction the widened middle portion comes to an attraction with the field pole so as to supply anew the turning torque to the armature to complete the rotation. The outlines of the face of the field pole is shown in dotted lines in Figures 8 to 10 and as the armature pole piece when attracted tends to come to a position to coincide with the field pole with respect to the lateral outline, the lateral lines or pole tips 37 of the middle portion of the armature pole piece are made to conform with the lateral lines of the field poles for positioning the armature coaxial with the field poles. The forms shown in Figures 8 and 9 are the same in operation, and in each the middle portion is shown to be twice wider than the lateral portions, and if operated below the saturation of magnet cores, these forms of pole piece will give substantially uniform torque throughout the rotation, which is a desirable feature for the armature of this signal. However, it may be often more advantageous to limit the size of the magnet cores of the field and particularly of the armature and operate the device to high magnetization of the cores. In such case the magnet cores become saturated toward the end of rotation of the armatures, with corresponding reduction of the turning torque. The form shown in Figure 10, with the width of the lateral portion and more particularly of the middle portion increasing toward the middle of the pole piece, and also with a corresponding modification in the shape of the field pole, is designed to make up the decreasing effect of the turning torque just mentioned. It is obvious that various other modifications may be made to suit different conditions.

The construction of the front signal is shown in Figures 11 to 14 inclusive, the front view of this signal being same with that of the rear signal, as shown in Figure 2.

In this form only one field magnet coil 27$^b$ is used, which energizes a pair of field poles 31$^b$ and 33$^b$ for operating a pair of armatures 22$^b$ and 23$^b$. It is apparent this construction is simpler than that of the rear signal, but with this form of field magnet it is possible to give only two signal indications, which are used to indicate turning to the right and turning to the left.

In this device the armature coils 24$^b$ and 25$^b$ are connected to the circuit not directly, but through a switch operated by the field coil 27$^b$, and this switch device is shown in Figures 11 and 12 and in detail in Figure 14.

Referring to Figure 14, a pair of projecting poles 31' and 33' are provided respectively on the pole pieces 31$^b$ and 33$^b$, to form attracting poles for an armature 45, which is held away from the poles by a spring 46, the latter being attached to the frame of the field magnet. A holding piece 48 is for holding the armature 45 at a proper distance from the attracting poles. The armature 45 carries a contact point 49, which is adapted to come into contact with a contact piece 47 when armature 45 is attracted.

The contact piece 47, which is insulated as shown, is connected through a conducting wire to the front frame 18$^b$ to make electrical connection with the armature coils 24$^b$ and 25$^b$.

When signal indicating the right or the left is given, the field coil 27$^b$ is energized, attracting, through the poles 31' and 33', the armature 45, and the contact point 49 is brought into contact with the contact piece 47, establishing a circuit from the armature coils 24$^b$ and 25$^b$, through the contact piece 47, contact point 49, the armature 45, the spring 46, to the frame of the field magnet which is grounded to connect to the source of the current. In case of the other signal indications the field coil 27$^b$ is not energized and the armature coils 24$^b$ and 25$^b$ are cut out by this switch from the circuit, though they are connected to the same transmission wire which operates the armatures of the rear signal. Although the field coil 27$^b$ is also connected to the transmission wires of the rear signal so as to be operated by the same switch mechanism by the operator, it is not energized in the operation of the stop or the back indication, owing to a manner of electrical connection hereafter to be described.

It can be noted that the above described automatic switch is mainly designed for saving the electrical current which otherwise may go to waste through the armature coils of the front signal when the latter does not participate in the signal operation, and so far as the operation of the armatures of the front signal is concerned, they do not turn even though they are energized, so long as the field magnet is not energized, as they stand at an intermediate position with respect to the field poles and in actual operation they are far less strongly energized than the field magnet, and it can be so arranged that their energization alone cannot turn them against the holding power of the restoring device which will be hereafter described.

Both front and rear frames 18$^b$ and 19$^b$ of the front signal are insulated from the body of the field magnet to which they are attached, while in case of the rear signal, the rear frame 19 has been directly connected to the body of its field magnet. A cover 50 which is made of a non-magnetic metal, is for protecting the armatures at the bottom side, as shown in Figures 11 and 12, and in Figure 13 this cover has been removed to give an inner view of the operating device. In other details this front signal is similar to the rear signal and the parts which perform the same function as those of the rear signal have been designated by the same numerals suffixed by the letter "b" and their arrangement can be understood from the drawings.

The means for restoring the armatures and thereby the signal to the normal position, after signal has been given, is shown in Figures 3 to 5 and in detail in Figures 15 to 17 and also the same device for the front signal can be seen in Figures 11 to 13.

Referring to Figures 15 to 17 inclusive, a frame 40 is secured, through its bracer 41, to the operating shaft which is either the tubular shaft 15 or the sleeve 17 as the case may be. A pair of flexible lines 39, such as a silk thread, are connected to the frame 40, one at each side of the operating shaft, preferably at points somewhat below the shaft, and they are joined together above the shaft, as if to form an isosceles triangle as shown in Figure 15 and suspended from one end of a spring 38. The other end of the spring 38, being coiled a few turns to increase the resiliency, is suitably secured to the body of the field magnet.

Figure 15 shows the device at the normal position, the spring 38 acting upward. At this position, if the shaft tends to turn to either direction, one of the flexible lines 39 is relieved from the tension and the force of the spring is thrown on the other line, thereby resisting the turning of the shaft and thus the shaft is steadily held at the normal position. Figure 16 shows the device turned to one angle which corresponds to the signal position of either the right or the left. Figure 17 shows the device at still another angle which corresponds to the position indicating either the stop or the back. In the position shown in Figures 16 and 17, one of the flexible lines 39 is entirely relieved from the tension and the other line which carries the tensile force of the spring 38 is wound around the rotating shaft and the tendency of the spring to turn the shaft so as to unwind the line will restore the device to the normal position as soon as the electro-magnetic operation ceases.

This device is not merely for restoring purpose, but has for another object to relieve the journal bearings from the weight of the revolving operating parts, and thereby to reduce the frictional resistance between the operating shaft and the bearings. It can be seen that the spring 38 is acting upward, carrying the weight of the operating part and if the spring power is properly adjusted the whole weight of the revolving operating part can be placed in suspension, relieving entirely the journal bearings from the pressure of the shaft, thereby reducing the frictional resistance to the minimum.

However, it may be sometimes the case that the weight of the operating part is heavier than to be conveniently carried by the restoring spring, so that if the spring is made strong enough to carry the whole weight, the restoring power is stronger than is actually required to restore the operating part, thereby taxing the electrical power that operates the device. In such case a device shown in Figures 18 and 19 may be employed in conjunction with above mentioned restoring device.

Referring to Figures 18 and 19, a spring 43 which is made of a thin piece of sheet metal is loosely mounted on a slender shaft 42' carried by a frame 42, which is to be secured to the body of the field magnet. The ends of the spring 43 tend to spring back upward, but are held in the position shown in the drawing by a flexible line 44, which passes round the operating shaft 15 and is connected to the ends of the spring. In this way the shaft 15 is suspended by the upward force of the spring 43. Figure 18 shows the device in the normal position. The flexible line 44, which is of such a material as silk thread, moves in contact with the shaft 15 as the latter turns one way or the other when the signal is operated, and the device takes a position such as shown in Figure 19, which indicates the device at one of the signal positions. It can be easily seen that the flexible line 44 offers little resistance to the turning of the operating shaft 15 and the effect of the sliding resistance that may exist between the shaft 42' and the spring 43 is very small, owing to a large leverage of the arms of the spring 43 compared with the diameter of the slender shaft 42', and thus the operating shaft 15 is suspended free to turn by this device, which relieves the bearing of the operating shaft from the journal pressure thereby reducing the frictional resistance between the shaft and the bearing.

This device is shown in position in Figure 3 and Figure 11, for the rear and front signals respectively, and in each case it is employed to carry the tubular shaft at the front of the field magnet as the indicating device extends far to the front and a larger proportion of the weight of the movable operating parts comes toward the front and it is for this suspending device to carry this excessive part of weight, while the rest of the weight is carried by the restoring device, which is employed at both the front and rear of the field magnet.

The movable operating parts of this signal are balanced in all sides and there is no weight to raise to operate this signal and it is therefore mainly against the journal friction of the shafts and the force of the restoring device that the electrical power has to be expended to operate this signal and also the force of the restoring device has to work against the frictional resistance of the journals and therefore the reduction of the journal friction results in the reduction of the restoring force and in turn results in the duplicate reduction in the operating power and it can be stated that a material gain in reducing the motor size and the operating power has been secured through these simple anti-friction devices just described.

To attract the attention of those around the vehicle which is about to turn or stop or move backward and cause them to look at the indicators, an electric bell 51 is provided on the back of the body 4 of the casing of the rear signal, as shown in Figures 3, 4, and 5, and a hammer 52 for striking the bell is operated by a magnet 53. This bell is not operated directly through the transmission wires by the operator, but it is automatically rung through the movement of the signals so that the operator can be informed as to whether the signals have been operated or not. The switch device to effect electrical connection to coils of the magnet of the electric bell is shown in Figures 3 and 4 and in detail in Figure 7.

Referring to Figure 7, a contact switch member 54 is mounted on one of the pole pieces of the armature 22 through an insulating piece 58 and rotates with the armature 22. Another contact switch member 55 is carried by a contact collar 56, the latter being secured around the sleeve 17, but insulated from the same. As the sleeve 17 is secured to the armature 23, the collar 56 with its associated contact switch member 55 can rotate with the armature 23. In the normal position of the signal the switch members 54 and 55 are mounted in their angular positions displaced by 180 degrees from each other, so that they come into contact with each other for closing the electrical circuit of the bell, whenever the armatures 22 and 23 are operated into their signal positions in which the armatures are always displaced 180 degrees from each other as described before.

The switch member 54 is of a thin resilient metallic piece and is adapted to make a flexible contact with the other switch member 55. The portion of the sleeve 17 adjacent to the switch member 54 is insulated on the surface so that the switch member 54 does not come into electrical connection with the sleeve 17, which is carrying an electrical current for energizing the armature coils. The switch member 54 is connected through a conducting wire to the journal 20 to receive electrical current from the transmission wire. A stationary contact 57 is in contact with the collar 56 for conducting the current toward the bell and is carried by a conducting piece 59 which is secured to the frame of the field magnet from which it is suitably insulated.

A similar switch device is carried by the front signal on the armatures 22$^b$ and 23$^b$, as shown in Figures 11 and 13. In case of this front signal, the stationary contact 57$^b$ which is in contact with the collar 56$^b$ is inserted to the position through an opening 60 made on the frame of the field magnet and is secured to the latter, from which it is insulated as shown. This stationary contact 57$^b$ is connected through a conducting wire to the bell magnet of the rear signal. In this way the circuit of the bell magnet is controlled by two switches, one on the rear signal and the other on the front signal, so that the failure of either or both of the signals results in the failure of the bell to ring, thus calling the attention of the operator.

Such is, however, the case in the right or the left operation. To enable the bell to have its circuit completed, in case of the stop or the back indication in which the front signal is not operated, another switch device is provided on the rear signal. This device is shown in Figure 5 at the lower part of the field magnet and in detail in Figure 6.

Referring to Figure 6, a switch armature 61 is supported, in the position shown, by a spring 62 which is attached to the pole piece 33, and is adapted to be attracted by the pole piece 34 of the field magnet. As will be seen when the electrical operation is described, this pole piece 34, in pair with the diametrically opposite pole, is energized in case of the stop or the back indication, attracting the armature 23 to the position shown in the drawing, whereupon the pole piece 34 assisted by the armature pole piece 26 attracts the armature 61. The armature 61 is provided with a contact member 63 which is adapted, when the armature 61 is attracted, to come into contact with a stationary contact 64 to which a conducting wire from the bell magnet is connected through its binding post 65, thus establishing the bell circuit through the contact 64, the contact member 63, the armature 61, the spring 62 to the body of the field magnet which is grounded.

In case of the right or the left indication, the field pole 34 is not energized and therefore the armature 61 is not attracted, but is held to the back by the spring 62, breaking the bell circuit which is completed, however, through the switch device of the front signal as described before.

When the armature 61 is not attracted, the contact member 63 is held against a contact 66, which holds the armature 61 at a proper distance from the pole piece 34. The contact 66 is provided with a binding post 67 and another binding post 68 is shown adjacent to the binding post 67 mounted on the same frame work and the use of these provisions will be hereafter described.

To illuminate the signal in the night electric lamps 10 are provided on the rear signal, as shown in Figures 3, 4, and 5. These lamps are mounted through lampholders 10' on the concave frame 35, which acts as a reflector for throwing the light of the lamps upon the indicating plates 8 and 9. The lampholders, together with the lamps are made detachable to the back from the frame 35, while an access to them may be gained by opening the front frame 3 from the body 4 of the casing when the lamps are to be replaced. Similar provisions for the front signal can be seen in Figures 11, 12, and 13.

There are two lamps provided on each signal and electrically they are connected in parallel and when one of these lamps is burnt out the other lamp still enables the signal to continue in service so that the burnt out lamp can be replaced at operator's convenience.

The arrangements of the conducting wires are shown in Figures 3 and 5 for the rear signal. The conducting wires 70, which pass to the front side of the frame 35 are connected at one side through binding posts 69 to various operating electrical devices of the signal and at the other side meet inside of a connection box 72 with conducting wires 71, which lead from the bell magnet and are connected to binding posts 73 while transmission wires 74, which lead to the operator's switch, are connected outside of the connection box to these binding posts 73 as shown. Similar arrangements can be seen in Figures 11 and 12 for the front signal.

The switch used for controlling the signal may be of various forms. In the present embodiment, as illustrated in Figures 20 to 24 inclusive, a manually operated crank 75 forms an indicating hand, which is moved to be registered at various signal positions indicated by sectors 76, which carry the indicating words as shown. The crank or indicating hand 75 is rigidly connected to a switch drum 77 by means of a shaft 78, which is journalled in a front plate 79 and a frame 80, so that the indicating hand can rotate for operating the switch drum. A projecting piece 81, pressed by a spring 82, is adapted to yieldingly engage in depressions or holes 83, provided on the indicating hand 75, as shown, for the proper positioning of the indicating hand.

Figure 24 shows the cylindrical surface of the drum 77 in development. It comprises two contact segments, 84 and 85, the remaining area being filled with an insulating material. Another contact segment 86 is shown in Figure 21. This contact segment 86 is of a disk form, being mounted on one end of the drum and is electrically connected with the contact segment 85. This contact segment 86 has been used in the disk form simply to shorten the length of the switch drum and it is really a part of the contact segment 85, and in Figure 24 they are shown connected with each other. These contact segments are insulated from the body of the drum upon which they are mounted. There are a number of stationary contact fingers to engage in contact with the contact segments of the drum. The contact fingers 87, 88 and 89 are grouped at one side of the drum, and the contact fingers 90, 91 and 92 are grouped at the opposite side, while the contact finger 93 bears on the disk segment 86. In Figure 24 these contact fingers are shown indicating their relative positions with respect to the longitudinal positions of the drum segments.

These contact fingers are mounted upon a connection board 94, from which they are insulated as shown. Their disposal on the board can be best seen in Figure 23, in which a portion of the drum is shown broken off but its outline is indicated in dotted lines. With exception of the contact fingers 92 and 93 these contact fingers are connected to the transmission wires 74, through respective binding posts 95. To gain an access to these binding posts an opening 96 is cut on the side of the casing and a cover 97 with its handle 98 can be removed when such is required. The handle 98 is for placing this switch device at any position convenient to the operator through a suitable attachment that can hold the handle.

A contact finger 99, which is also mounted on the connection board 94, is connected, through its binding post, to the transmission wire of the signal lamps and forms a lamp switch that controls the circuit of the signal lamps, and engages in contact with a contact 103 for closing the circuit and is operated by a cam 100, made of an insulating material. The cam 100 is connected to a lamp switch indicator 101 through a shaft 102. In the position of the lamp switch indicator shown in the drawings the switch is closed and if the indicator is turned to the opposite position, the contact finger 99 is released from the projecting point of the cam 100 and springs back from the contact 103, breaking the circuit of the signal lamps for day time operations. The contact 103, which is provided with a binding post 104, is connected to the contact fingers 92 and 93 in a manner hereafter to be described.

To illuminate in the dark the front face of the switch which carries the indicators, a switch lamp 105 is provided. This lamp is employed for the purpose of indicating to the operator whether the signal lamps are operated or not, and the electrical connections for accomplishing this purpose will be hereafter described.

In Figures 25 to 28 inclusive, the connection of the contact fingers with the contact segments of the drum are shown diagrammatically, the drawings showning the disk segment 86 at the center and the drum surface drawn from the end adjacent to the disk segment to the other end, with increasing diameters, so that the cylindrical surface of the drum can be seen in a circular projection. The dotted lines shown indicate the lines of contact of the contact fingers with the drum surface.

Figure 25 shows the position of the drum corresponding to the indication of the right. Figure 26 shows the position of the left. Figure 27 shows the position of the stop. Figure 28 shows the position of the back. The normal position of the drum is similarly shown in Figure 29 in conjunction with electrical connections.

Figure 29 shows the electrical connections in which various devices of the rear signal and those of the front signal are grouped respectively at the upper and the lower portions while the switch device is represented at the middle.

The numeral 155 designates the source of electrical current, one pole of which is grounded to the body of the automobile and the other pole is connected by a wire 106 with contact finger 87. A wire 107 leads from contact finger 89 to a connection 108 and a wire 109 leads from connection 108 to field coil 30 of the rear signal, while a wire 109$^b$ leads from connection 108 to field coil 27$^b$ of the front signal. A wire 110 leads from contact finger 91 to a connection 111 and a wire 112 leads from connection 111 to field coil 27 of the rear signal, while a wire 112$^b$ leads from connection 111 to field coil 27$^b$ of the front signal. A wire 117 leads from contact finger 88 to a connection 116 to make connection with field coils of the rear signal. The field coils of the rear signal are connected with each other by wires 113, 114 and 115 as shown.

A wire 118 leads from contact finger 90 to a connection 119, and a wire 120 leads from connection 119 to front frame 18 of the rear signal, while a wire 120$^b$ leads from connection 119 to rear frame 19$^b$ of the front signal. In the rear signal a wire 121 leads from journal 20 to one end of coil 24, the other end of which is connected to the body of the armature 22. A wire 123 leads from wire 121 to contact member 54. A wire 122 leads from journal 21 to one end of coil 25, the other end of which is connected to the body of the armature 23 and rear frame 19 is connected to ground. Similarly, in the front signal a wire 121$^b$ leads from journal 20$^b$ to one end of coil 24$^b$, the other end of which is connected to the body of the armature 22$^b$. A wire 123$^b$ connects wire 121$^b$ and contact member 54$^b$. A wire 122$^b$ leads from journal 21$^b$ to one end of coil 25$^b$, the other end of which is connected to the body of the armature 23$^b$. A wire 124 leads from front frame 18$^b$ to switch contact 47, while switch armature 45 is connected to ground.

A wire 125 leads from stationary contact 57 of the bell switch of the rear signal to one end of bell magnet 53. A wire 126 leads from the other end of the bell magnet to stationary contact 57$^b$ of the bell switch of the front signal. From the latter end of the bell magnet a wire 129 leads to a resistance coil 128. A wire 127 leads from resistance coil 128 to contact 64 of the automatic bell switch of the field magnet of the rear signal, while armature 61 is connected to ground. A wire 130 branches out from wire 129 and is connected to the binding post 68.

A wire 131 leads from contact finger 93 to the switch lamp 105, and a wire 132 leads from the switch lamp 105 to contact 103 of the lamp switch. A wire 133 leads from contact finger 92 to one end of a resistance 134, the other end of which is connected to wire 132. A wire 135 leads from contact finger 99 of the lamp switch to a connection 136. A wire 137 leads from connection 136 to lamps 10 of the rear signal, while the lamps 10 are connected to ground as shown. A wire 137$^b$ leads from connection 136 to lamps 10$^b$ of the front signal, and a wire 138 leads from lamps 10$^b$ to stationary contact 57$^b$ of the automatic switch.

When the operator's switch is arranged in normal position with the indicating hand 75 positioned as shown in Figure 20, and with the switch drum 77 in the corresponding position as indicated in Figure 29, the contact finger 87 rests upon the insulator of the drum and there is no current flowing and the armatures of the rear signal are held by the restoring device in the position shown in Figure 5, and the armatures of the front signal are held by similar device in the position shown in Figure 12, at which time the colored portion of the inner plate of each of the signals stands at the top covered by the white half of the outer plate, which together with the lower white half of the inner plate presents a completely white plate to the view.

The operation is as follows: If it be desired to signal that the automobile is about to turn to the right, the operator will turn the switch indicating hand 75 to the right and register the same to the sector, which signifies that signal, whereupon the spring pressed projection 81 falls into the hole 83 arresting the movement of the indicating hand and holds the same to the position. This will place the switch drum in the position shown in Figure 25 and will produce the circuits as follows: Referring to Figures 25 and 29, from battery 155 through wire 106 to contact finger 87, through contact segment 85 to contact finger 91, through wire 110 to connection 111, where circuit divides and one circuit to the rear signal continues through wire 112, coil 27, wire 114, coil 29, connection 116, wire 115, coil 28, wire 113, coil 30, wire 109 to connection 108, through wire 107, contact finger 89, contact segment 84, contact finger 90, wire 118 to connection 119, through wire 120 to front frame 18 of the rear signal, thence through journal 20, wire 121 to coil 24, thence through the body of the armature 22, shaft 15, shaft 16, sleeve 17, body of armature 23 to coil 25, through wire 122, journal 21, frame 19 to ground for returning to battery.

The branch circuit to the front signal continues from connection 111 through wire 112$^b$, field coil 27$^b$, wire 109$^b$ to connection 108, joining with the circuit of the rear signal, thence through the same circuit as just traced for the rear signal to ground.

As soon as current is established through field coil 27$^b$, the field magnet of the front signal is energized and attracts the armature 45 of the automatic switch, which closes the circuit of the armature of the front signal, causing current to flow from connection 119 through wire 120$^b$, rear frame 19$^b$, journal 21$^b$, wire 122$^b$ to coil 25$^b$, through body of armature 23$^b$, sleeve 17$^b$, shaft 16$^b$, shaft 15$^b$, body of armature 22$^b$, to coil 24$^b$, through wire 121$^b$, journal 20$^b$, frame 18$^b$, wire 124, contact 47 and armature 45 of the automatic switch to ground.

This circuit energizes the field coils of the rear signal in such a manner as to produce collectively the north pole on the pole piece 31 and the south pole on the pole piece 33 and at the same time energizes the coils of the armatures 22 and 23 to produce magnetic lines of force in opposite directions, establishing the south pole at the top and the north pole at the bottom on the armature 22 and the north pole at the top and the south pole at the bottom on the armature 23, and acts to turn the armature 22 clockwise and the armature 23 counter-clockwise, when viewed in the position shown in Figure 5 and each through an angle of 90 degrees, so that they both stand 180 degrees apart from each other, causing the indicating plates 8 and 9 to take the corresponding positions, which give the signal indication shown in Figure 2.

In case of the front signal, this circuit energizes the field coil 27$^b$ so as to produce the north pole on pole piece 31$^b$ and the south pole on pole piece 33$^b$, and at the same time energizes the coils of the armatures 22$^b$ and 23$^b$ to produce magnetic lines of force in opposite directions, establishing the north pole at the top and the south pole at the bottom on the armature 22$^b$, and the south pole at the top and the north pole at the bottom on the armature 23$^b$, and acts to turn the armature 22$^b$ counter-clockwise and the armature 23$^b$ clockwise, when viewed in the position shown in Figure 12, and each through an angle of 90 degrees, so that they both stand 180 degrees apart from each other, causing the indicating plates 8$^b$ and 9$^b$ to take the corresponding signal positions in which the distinguishing color of the inner plate stands at the same right side of the operator as that of the rear signal. So long as the switch indicating hand 75 is in the position set, current will continue to flow and maintain the indicators of both the front and rear signals in this position. As soon as the switch indicating hand is returned to the normal position indicated in Figure 20, the switch drum is restored to the position shown in Figure 29, thereby breaking the circuits and de-energizing the various coils of both signals and allowing the restoring devices to turn their respective armatures back to normal position, so that the indicators of both front and rear signals again present the appearance of plain plates.

When the operator desires to indicate that he is to turn to the left, he turns the switch indicating hand 75 to the left till it points to the sector indicated by the word "Left," thereby placing the switch drum in the position shown in Figure 26. This connects contact finger 87 to same drum segment 85 as in the previous operation, while contact fingers 89 and 91 exchange their connections with respect to the drum segments, so as to reverse the direction of current through the field coils of both front and rear signals to which they are connected, and at the same time contact finger 90 to which the armatures of both front and rear signals are connected rests on the same drum segment 84, so that the direction of current through these armatures remains the same as in the previous case and in this case, too, the circuit of the armature coils of the front signal is closed by the switch armature 45, which is operated by the field coil 27$^b$ as before. Thus it can be seen that in this operation the field coils of both front and rear signals are energized in the directions opposite to those given in the preceding operation, causing in case of the rear signal the north pole to be on the pole piece 33 and the south pole on the pole piece 31, and in the case of the front signal the north pole on the pole piece 33$^b$ and the south pole on the pole piece 31$^b$, while the direction of magnetic lines of force in the armatures remains the same as in the preceding case, thereby actuating the indicating plates of both front and rear signals in exactly opposite directions to those in the preceding case and causing the distinguishing color of the inner plate to appear to the left of the operator in each of the front and the rear signals.

As the signals are operated into either of the before described signal positions, the contact member 54 carried by the armature 22 of the rear signal is moved into electrical connection with the contact member 55, which is associated with the armature 23, and the contact member 54$^b$ carried by the armature 22$^b$ of the front signal is moved into electrical connection with the contact member 55$^b$, which is associated with the armature 23$^b$, forming a shunt circuit from wire 121, through wire 123, contact member 54, contact member 55, collar 56, contact 57, wire 125 to the bell magnet 53, thence through wire 126 to contact 57$^b$, through collar 56$^b$, contact member 55$^b$, contact member 54$^b$, and wire 123$^b$ to wire 121$^b$, joining with the circuit of the armature coils of the front signal. This circuit energizes the bell magnet and thus the bell is automatically rung. If for any reason any of these armatures fails to operate, the circuit of the bell magnet cannot be established and the silence of the bell will attract the operator's attention as to the condition of his signals.

In each of the foregoing operations, if it is desired to have the signal lamps 10 and 10^b illuminated, the indicator 101 of the lamp switch is turned to the position shown in Figure 20, thereby closing the contact finger 99 of the lamp switch against the contact 103 and when the circuits of either of the foregoing operations were established, lamp circuits would be established, branching from the contact segment 85. One circuit continues through contact segment 86, contact finger 93, wire 131, switch lamp 105 to wire 132, and at the same time a parallel circuit continues through contact finger 92, wire 133, resistance 134 to wire 132, joining with the other circuit and the joined circuit continues through contact 103 and contact finger 99 of the lamp switch, wire 135 to connection 136, where the circuit divides, thence one circuit, through wire 137 to the signal lamps 10 of the rear signal, thence to ground, while the other circuit continues through wire 137^b to the signal lamps 10^b, of the front signal, thence through wire 138 to contact 57^b, joining with the bell circuit, which continues through collar 56^b, contact members 55^b and 54^b and so on to ground as described before and thus the lamps of both front and rear signals are simultaneously operated and at the same time the switch lamp 105 is lighted.

The switch lamp 105 is preferably made of a low voltage and of a small candle power compared with the signal lamps, but has a current capacity equal to the rear signal lamps put together and the resistance 134 is proportioned with respect to the switch lamp to carry a current equal in amount to the front signal lamps put together, so that when all lamps of both front and rear signals are lighted, the switch lamp will burn with normal brilliancy. If one or more of these signal lamps are burnt out or otherwise not lighted, the brilliancy of the switch lamp 105 is accordingly reduced, which is brought to the operator's attention, so that the lamps can be replaced or the trouble is otherwise looked after. The manner of diminution of the light of the switch lamp, when four signal lamps used in this operation are of same size, is such that if one of the signal lamps is burnt out the dimming of the switch lamp is slight but its change from the normal burning is clearly noticeable and in case two are burnt out the burning of the switch lamp is very much reduced, but still there is a light, while in case the third one goes out no more light can be noticed on the switch lamp and in this way the operator, when he is used to these changes, is able to tell whether it is one or two or more than two of the signal lamps that failed.

It should be noted that in case of the front signal, the signal lamps 10^b are connected into the circuit through its bell switch composed of the switch members 54^b and 55^b and therefore the failure of the movable operating members should result in non-operation of the signal lamps which in turn results in the failure of the switch lamp, and thus the switch lamp is indicating the operation of both the signal indicators and the signal lamps at the same time.

If the operator desires to indicate that he is coming to a stop, he turns the indicating hand 75 of the switch to the left till it comes to point to the lower left sector with the indicating word "Stop," thereby placing the switch drum in the position shown in Figure 27, which establishes the following circuits: referring to Figures 27 and 29, from battery 155, through wire 106, contact finger 87, contact segment 85, contact finger 88, and wire 117 to connection 116, where the circuit divides and one branch continues through coil 29, wire 114, coil 27, wire 112, connection 111, wire 110, and contact finger 91 to drum segment 84, while the other branch continues from connection 116 through wire 115, coil 28, wire 113, coil 30, wire 109, connection 108, wire 107, contact finger 89 to drum segment 84, where two circuits join, thence joined circuit continues through contact finger 90, wire 118, connection 119, wire 120 and so on through the armatures of the rear signal to ground as traced in the previous operations.

In this arrangement of electrical connections both ends of the field coil 27^b of the front signal are connected through respective transmission wires to the same drum segment 84, and therefore there is no current flowing through the coil 27^b and the armature 45 of the automatic switch is not attracted and thereby the circuit of the armatures of the front signal is open so that the front signal is not operated by this connection, while in case of the rear signal this circuit, as before traced, energizes the field coils in such a manner as to collectively produce the north pole on the pole piece 34 and the south pole on the pole piece 32, and energizes the armatures in the same magnetic direction as in the other operations described before. By this energization the armature 23 is held at the original position while armature 22 is turned end to end through 180 degrees, so that the white half of the outer plate 8 is turned from the top to the bottom, exposing the colored portion of the inner plate, which stands at the top of the signal face.

It can be noted that when the switch drum is moved to the position of the stop it has to pass the position of the left, and this starts the armature 22 instantly to that direction and thereafter the commutation of electric contacts is done continuously, always sending current in a direction which tends to bring the armature to the intended position of the stop.

If the operator desires to give still another signal in which he intends to start the automobile to the back, he has to turn the switch indicating hand 75 to the right till it points to the sector with the word "Back," thereby placing the switch drum in the position shown in Figure 28. This connects contact finger 87 with drum segment 85 and contact finger 90 with drum segment 84, which is the same as before, while contact finger 88 is connected to drum segment 84 instead of to drum segment 85, as has been the case in the stop indication, while both contact finger 89 and contact finger 91 rest on drum segment 85. The latter connection shows that both ends of the field coil 27$^b$ of the front signal are connected to same drum segment and therefore the front signal is not operated as it has been explained in the preceding case of the stop indication. In case of the rear signal the energization of the field coils, as can be easily seen, is the exact reverse of that in the preceding stop indication, thereby producing the north pole on the pole piece 32 and the south pole on the pole piece 34, while the energization of the armatures remains the same as before, so that the armature 22 with its outer plate is held stationary, while the armature 23 with its inner plate is turned end to end through 180 degrees displaying the distinguishing color at the bottom of the signal face.

When the armatures of the rear signal are operated into either of the preceding two operations of indicating the stop and back, the contact member 54 is brought into electrical connection with the contact member 55 and thereby closes this switch of the bell circuit, which, however, cannot be established through wire 126 to the bell switch of the front signal which is not operated, but is established through the switch shown in Figure 6. As the pole piece 34 is energized, the armature 61 of the switch is attracted and its contact member 63 is brought into connection with the contact 64, establishing the bell circuit from wire 121 through wire 123, contact members 54 and 55, collar 56, contact 57, wire 125, bell magnet 53, wire 129, resistance coil 128, wire 127, contact 64, contact 63, armature 61, to ground, and thus the bell is operated independently from the front signal and will indicate to the operator whether the rear signal is operated or not.

From the foregoing descriptions of the circuits in various operations, it can be seen that in case of the indication of the right or the left, the field coils of the rear signal are connected all in series, while in case of the stop or the back they are connected in parallel series. This change of connections would result in the change of the amount of current that flows through the bell magnet which is connected in series with these field coils, and for this reason the resistance coil 128 has been inserted in the bell circuit to reduce the current in the stop and back operations, so as to operate the bell with the same strength as in the other operations. This resistance coil is wound around the bell magnet 53 so as to assist in the energization of the magnet and serve for reducing the amount of current required for operating the bell.

To enable the bell to be operated by the rear signal alone in the right and the left operations, as it has been the case in the other operations, the conducting wire 130 is provided, which has not been used in any of the foregoing operations but has been bound on the insulated binding post 68. It may be the case sometimes that the front signal is out of order and yet the rear signal may be available to protect the rear side, while the operator manages to take care of the front. In such case the operator will transfer the wire 130 from the binding post 68 to the adjoining binding post 67 and operate the signal either to the right or to the left in the same way as before described, and the following bell circuit will be established when the signal is operated: branching from wire 121 through wire 123, contact members 54 and 55, collar 56, contact 57, wire 125 to bell magnet 53, thence through wire 129, wire 130, binding post 67, contact 66, contact member 63, armature 61 to ground, thus the bell is operated. In case of the operation of the stop or the back, the contact member 63 is separated from the contact 66 but is connected to the contact 64 for establishing the bell circuit which has been described before. In this way the bell is operated by the rear signal alone in all of these signal operations, so that the rear signal is made a complete set in itself.

In case both front and rear signals are used always in cooperation, as these devices are primarily intended, the switch device shown in Figure 6 with the wire 130 can be dispensed with, if such is desired, in which case wire 127 is directly connected to ground.

It is apparent this change of connection makes no difference in the stop or back indication, as in either operation the switch device just referred to was used simply to connect wire 127 to ground. In case of the right or left indication, the wire 127 is now connected to ground instead of being disconnected by said switch device and therefore when both signals are operated, the current will find its way from the bell magnet through wire 129, resistance coil 128, wire 127 to ground. However, the amount of this current is comparatively small on account of the resistance coil 128 and the greater portion of the bell current will take more direct passage through the wire 126 to the bell switch of the front signal, thence to ground, and thus the bell is operated. If the rear signal fails to operate in this case, the bell circuit is disconnected at its bell switch, composed of the contact members 54 and 55, which controls entire bell circuit and there can be no current through the bell and the bell is not operated. If the front signal, instead of the rear signal, fails to operate, the bell circuit is disconnected at its branch through the switch composed of the contact members 54$^b$ and 55$^b$, but the bell current can find its passage by way of the resistance coil 128 to ground. However, the bell current is now much reduced on account of the resistance of the coil 128, so that the bell would not operate with this reduced current. Or it can be so arranged that the bell can operate with this reduced current but with much lessened strength, so that the change of the sound of the bell can be easily recognized by the operator to whom this will indicate that it is the front signal but not the rear signal that failed.

In each of those before described operations of indicating the stop and indicating the back, if the signal lamps are desired to be illuminated, the lamp switch composed of the contact finger 99 and the contact 103 is closed and when the electrical circuit of either of these operations is established a branch circuit for the signal lamps would be formed from contact segment 85 through contact segment 86, contact finger 93, wire 131, switch lamp 105, wire 132, contact 103, contact finger 99, wire 135, connection 136, wire 137 to lamp 10 of the rear signal, illuminating the same and thence to ground. As in either of these two signal operations the front signal is not operated; the lamps 10$^b$, which are connected into the circuit only through the operation of the automatic switch device of the front signal, are not operated, and also no current can pass through the wire 133 and the resistance 134 in either of these operations, as the contact finger 92 rests on the insulating member of the switch drum and all current that passes through the rear signal lamps is made to flow through the switch lamp 105 which has, as stated before, the same current capacity as the rear signal lamps put together, so that the switch lamp 105 will burn normally when all lamps of the rear signal are lighted, while the failure of either or both of these signal lamps will be respectively indicated by much diminished light or non-operation of the switch lamp.

In Figures 21 and 22 is shown an alternative device through which the switch lamp can be lighted as the signal lamps are operated, the switch lamp in this case being controlled by an electro-magnetically operated switch which in turn is controlled by the circuit of the signal lamps. Referring to Figures 21 and 22, an electro-magnet 140, which carries a coil 141, is mounted inside of the casing of the switch, said magnet being provided with pole pieces 142 which is to be energized by the coil 141. An armature 143, which is adapted to be attracted by said pole pieces, is secured to a shaft 144 and through which is mounted for rotation upon a frame 145, which is in turn attached to one of the pole pieces. In this way the armature is supported at its center of gravity so that the vibration of the running vehicle does not interfere with its operation. A spring 146, which is made of a thin resilient piece of metal, is secured at one end to the shaft 144 and at the other end bears on the tip of an adjusting screw 147. The screw 147 is mounted on and extends through a tapped bracket 148, which is in turn attached to the frame of the magnet. The spring 146 when pressed by the screw 147 acts to turn the armature 143 away from the pole pieces 142, the armature, however, being held to the position by a coil holder 149 upon which it bears at one end. The screw 147 is for adjusting the spring to fit the strength of the magnet that operates the armature, and when adjusted, the screw may be tightened by a clamp nut 150. The armature 143 carries at one end a contact point 151 and when the armature 143 is attracted, this contact point is brought into connection with a contact 152, which is mounted on the frame of the magnet from which it is suitably insulated. To this contact 152 the switch lamp 105 is connected through a conducting wire, while the armature 143 is in metallic connection with the frame of the magnet which is connected to ground, so that the circuit of the switch lamp is formed through this switch.

The circuit of the signal lamps is formed through the coil 141 and when the lamps are lighted, the current which passes through the coil 141 energizes the pole pieces 142, which in turn attract the armature 143 and bring the contact point 151 into electrical connection with the contact 152, thereby closing the circuit of the switch lamp. The spring 146 acts on the armature against this attraction of the magnet and when properly adjusted, it can control the operation of the switch in such a manner that when all signal lamps are lighted the energization of the coil 141 is strong enough to operate the switch so as to light the switch lamp; but in case of failure of any of the signal lamps to burn, the diminished current that goes through the coil is not sufficient to close the switch against the spring that holds the armature, thereby resulting in non-operation of the switch lamp.

Figure 30 shows the electrical connection of this device, which is to be used in conjunction with the general circuit shown in Figure 29, as a substitute for wire 131, lamp 105, wire 132, resistance 134 and wire 133, indicated in said Figure 29. Referring to Figures 29 and 30, a wire 131′ is connected to one end of the coil 141, a wire 132′ is connected to the other end of the coil 141 and a wire 133′ is connected to the coil 141 at an intermediate point, as shown, and the end 93′ of wire 131′, the end 92′ of wire 133′ and the end 103′ of wire 132′ are respectively connected to contact finger 93, contact finger 92 and contact 103 of Figure 29. A wire 153 leads from contact 152 to switch lamp 105 and one end of a wire 154 is connected to switch lamp 105 and the other end 87′ is connected to contact finger 87 of Figure 29, while shaft 144 of armature 143 is connected to ground.

This device is operated as follows: When the switch drum is moved into either position of indicating the right or the left as described before and the lamp switch 99 is closed, the following lamp circuit is established: Referring to Figures 29 and 30, branching from drum segment 85, through contact finger 92, wire 133′ to coil 141, thence through wire 132′ to contact 103, thence through the same route as described before to the signal lamps 10 and 10ᵇ of both front and rear signals, and thence to ground. This circuit energizes the coil 141, thereby operating the armature 143, so that the contact point 151 comes into electrical connection with the contact 152, which establishes the circuit of the switch lamp from contact finger 87, through wire 154, switch lamp 105, wire 153, contact 152, contact point 151, armature 143, shaft 144 to ground, operating the switch lamp. If any of the signal lamps in this case fails to operate, the current in the circuit of the signal lamps accordingly falls down and the energization of the coil 141 is thereby reduced and the power of the spring 146, as already described, holds the armature back against this diminished magnetic force of attraction, preventing the contact point 151 from coming into connection with the contact 152 and the switch lamp is not lighted, which calls the attention of the operator.

As the contact finger 93 is also in electrical connection with the drum segment 85 in this operation, there may be some current flowing through the route of said contact finger 93 and wire 131′ to the coil 141, but as this route is short circuited by wire 133′ only small amount of current, if any, takes this route, so that the main energization of the coil 141 is made through its right half, as shown. However, this division of current between two routes of the wire 131′ and the wire 133′ depends on the amount of the resistance of the left half of the coil 141, and this matter will be hereafter referred to.

In case of the operation of indicating either the stop or the back, the circuit of the signal lamps is formed as follows: Branching from drum segment 85 through segment 86, contact finger 93, wire 131′ to coil 141, thence through wire 132′ to contact 103, thence through the previously mentioned route to the signal lamps 10 of the rear signal and thence to ground. In this operation the front signal lamps are not connected in the circuit as described before and the contact finger 92 rests on the insulating segment of the switch drum as can be seen in Figures 27 or 28 and therefore no current is flowing through wire 133′, so that all current that passes to the rear signal lamps has to take the route of wire 131′, and, although on account of the non-operation of the front signal lamps the current is reduced, yet the energization of the magnet 140 remains the same as before, as the current has to traverse through the entire length of the coil 141 instead of part of it, as has been the case in the preceding operation, and the armature 143 is operated so that the switch lamp 105 is lighted, while the failure of any of rear signal lamps will result in non-operation of the switch lamp in same way as described before.

The division of the coil 141 into two parts through the connection of the wire 133′, as shown in the drawing, must be so proportioned according to the relative size of the signal lamps used in the front and the rear signals that the energization of the magnet 140 is same in both of the above described two different ways of operations when all signal lamps in each operation are lighted.

The lighting batteries and lamps for the automobile use at the present time is fairly standardized as to their voltage and they are made to fit to one another. To make these batteries and lamps of general use available for this signal device, as this modified arrangement for lighting the switch lamp is primarily designed for, it is desirable that the resistance of the coil 141, which is connected in series with the signal lamps, is as small as possible, as otherwise it will reduce the available lighting voltage, so that the signal lamps would burn less bright than normal. The power required to operate the switch armature 143 is very small and therefore no large number of windings of the coil 141 is required and the magnet core may be rather slender and the desired reduction of the resistance of the coil 141 can be secured without difficulty. However, when the resistance of the coil 141 or more exactly that of the left half of said coil, as shown in Figure 30, becomes very small, the current does no more divide itself always in an accurate proportion between the wire 131' and the wire 133' when they are both in the circuit, as the resistance of contact between the contact segment and the contact finger in each route of the circuit is of a variable nature, owing to the condition of the surfaces of the contacting members and this irregularity, though small in amount, has an apparent effect on the division of the current between two routes when the resistance of the left portion of the coil 141 becomes very small, so that it interferes with an accurate operation of this switch device.

Figure 31 shows a modification of the drum in which the disk segment 86 of the former form has been replaced by a sector 86' through which above mentioned trouble can be remedied. The sector 86' occupies an arc somewhat less than semicircle, the remaining portion of the replaced disk being filled with an insulating material so that this sector 86' does not come into contact with contact finger 93 in either operation of the right or the left, but it does in case of the indication of the stop or the back, in which the contact finger 92 is not in electrical connection with the drum. In this way contact fingers 92 and 93 are electrically connected to the drum one at a time in either of signal positions and if the wires 133' and 131' are connected to the respective contact fingers, all the current of the signal lamps has to pass through either one of these routes in each operation and thus a definite energization of the coil 141 can be secured.

The armature 143 of this device has been used for operating the switch of the switch lamp, but it is clear that its movement can be utilized to operate a movable indicator directly for accomplishing same object of indicating the condition of the signal lamps.

While I have hereinbefore described the preferred form of carrying out my invention, it should be understood that I do not limit myself to the specific construction shown.

What I claim is:

1. A signal comprising two concentrically revolvable indicating members, means for operating said indicating members into various predetermined angular positions to indicate different signals, an auxiliary electric signal for indicating to the operator whether said indicating members are operated or not and switch means comprising two switch operating members for controlling the circuit of said auxiliary electric signal, said switch operating members being carried by the respective indicating members and adapted to come into engagement with one another for closing the circuit of said auxiliary signal when said indicating members are operated into any of their predetermined indicating positions.

2. A signal comprising a plurality of separate signal devices adapted to be placed at different locations, means for operating said signal devices simultaneously or individually, an auxiliary signal for indicating whether said signal devices are operated or not, and means whereby said auxiliary signal is automatically operated either by the mutual cooperation of several signal devices or by the individual signal device, according to whether said signal devices are simultaneously or individually operated.

3. A signaling apparatus comprising signal lamps consisting of two units, means for operating both units simultaneously or one of units singly, an auxiliary signal means for indicating to the operator whether said signal lamps are operated or not, a route of circuit common to both units of said lamps, said route of circuit being located in said auxiliary signal means for operating the same and means for controlling said route of circuit according to whether one or both units of the lamps are operated, in order that a uniform operation of said auxiliary signal may be secured thereby.

4. An electric signal comprising a revolvable indicating means, a shaft connected to said indicating means, electric means to turn the shaft for operating said indicating means into signal position and a restoring device for automatically restoring said indicating means to the normal position when the operation of said electric means ceases, said restoring device comprising a spring and a pair of flexible lines, said flexible lines being connected to said shaft one at each side of the same and jointly connected, above the shaft, to said spring, whereby said shaft together with its associated part is suspended.

5. An electric signal comprising a revolvable indicating means, a shaft connected to said indicating means, electric means to turn shaft for operating said indicating means into signal positions and a means for suspending said shaft, consisting of a flexible line which passes around the shaft and a spring device which suspends the shaft through said flexible line and allows the flexible line to move in contact with the shaft as the latter turns one way or the other when the signal is operated.

6. An electric signal comprising a revolvable indicating means, a shaft connected to said indicating means, electric means to turn said shaft for operating said indicating means into signal positions, a restoring device for automatically restoring said indicating means to the normal position when the operation of the electric means ceases, said restoring device comprising a spring and a pair of flexible lines, said flexible lines being connected to said shaft one at each side of the same and jointly connected, above the shaft, to said spring whereby said shaft is suspended and a suspending device for suspending said shaft in conjunction with said restoring device, comprising a pliable line which passes around the shaft and a spring device which suspends the shaft through said pliable line and allows the pliable line to move in contact with the shaft as the latter turns one way or the other when the signal is operated.

7. In an electric signal, a revolvable indicating means and a motor device therefor, comprising a field magnet with a plurality of diametrically opposite pairs of poles disposed around the rotating axis of the motor and one or more armatures mounted for rotation on the axis of the motor for operating said indicating means and provided with pole pieces adapted to be attracted by said field poles in both directions of rotation, each of said armature pole pieces having a pole face which faces toward the field poles and is adapted to pass magnetic lines of force to the latter, said pole face extending laterally so as to cover an arc larger than that of the individual field pole and the middle portion of said pole face, length of which covers substantially the same arc as the individual field pole, having its width enlarged from both laterally extending portions which are made each to cover only a partial width of the field poles, said middle portion forming, through the enlargement of its width, a pole shape which is marked by lateral outlines conforming with those of the field poles and being thereby adapted to be drawn into alignment with the field poles when attached by the same.

8. In a signal device, the combination of a casing consisting of a front frame and a body, said front frame having a transparent front, an indicating means in said casing adapted to display a signal through said transparent front, a motor device inside of the casing connected to said indicating means for operating the same, a concave frame for connecting said motor device to said front frame and electric lamps mounted upon said concave frame and adapted to be reflected by the latter to throw light upon said indicating means and said front frame being arranged to be opened from said body of the casing for the purpose set forth.

9. A signaling device comprising a casing having a transparent front, an operating shaft centrally mounted inside of the casing, a plurality of spokes radiating from said shaft, a cylindrical frame mounted upon said spokes, an indicating plate mounted upon said cylindrical frame and adapted to display a signal through said transparent front, a concave frame in said casing, a motor device to turn said shaft for operating said indicating plate, being centrally mounted on said concave frame, and electric lamps mounted on said concave frame at each side of the motor device, said concave frame being adapted to reflect the light of said lamps upon said indicating plate.

10. A signal comprising an indicating means, an electric signal lamp for illuminating said indicating means, means for operating said signal lamp and an auxiliary signal operated by an electro-magnet for indicating to the operator whether said signal lamp is operated or not, said electro-magnet being energized by the circuit of said signal lamp when the signal lamp is operated.

11. A signal comprising a movable indicating means, an electric signal lamp for illuminating said indicating means, means for operating both the indicating means and the signal lamp simultaneously and an auxiliary signal operated by an electro-magnet for indicating to the operator whether said signal lamp is operated or not, said electro-magnet being operated by the circuit of said signal lamp when said signal lamp is operated.

12. A signaling apparatus comprising a plurality of separate signal devices placed at different locations, said signal devices being respectively provided with movable indicating means, means for operating said indicating means simultaneously and an auxiliary signal means consisting of a single unit, for indicating to the operator whether said indicating means are operated or not, said auxiliary signal means being operated by the mutual cooperation of all of said indicating means when the indicating means are simultaneously operated.

13. A signaling apparatus comprising a plurality of signal devices placed at different locations, said signal devices being respectively provided with indicating means, a plurality of electric lighting means for respective signal devices to illuminate said indicating means, means for operating said lighting means simultaneously, a telltale means for indicating to the operator whether said lighting means are operated or not, said telltale means comprising an electric device through which an electric circuit is established for operating the telltale means, said lighting means being electrically connected in parallel with each other while they are all connected in series with said electric device so that the currents of all of the lighting means may take same route of circuit through said electric device and act together to operate the telltale means.

14. A signaling device comprising an indicating means, a plurality of electric signal lamps for illuminating together said indicating means, means for operating said signal lamps simultaneously, a telltale means for indicating to the operator whether said signal lamps are operated or not, said telltale means comprising an electric device through which an electric circuit is established for operating the telltale means, said signal lamps being electrically connected in parallel with each other while they are all connected in series with said electric device so that the currents of all of the signal lamps may take same route of circuit through said electric device and act together to operate the telltale means.

HOSAKU KAGEYAMA.